United States Patent [19]

Littlejohn

[11] Patent Number: 4,597,585
[45] Date of Patent: Jul. 1, 1986

[54] TRAILER CARAVAN

[75] Inventor: Robert J. Littlejohn, Greenville, S.C.

[73] Assignees: Marvin L. Ellenburg, Easley; Samuel L. Huffman, Greenville, both of S.C.

[21] Appl. No.: 673,363

[22] Filed: Nov. 20, 1984

[51] Int. Cl.⁴ .......................... B62D 53/00; B60P 3/10
[52] U.S. Cl. ............................. 280/411 C; 280/414.1; 280/474
[58] Field of Search ............... 280/414.2, 411, 411 C, 280/412, 414.1, 482, 474; 296/157; 414/467, 498

[56] References Cited

U.S. PATENT DOCUMENTS

| | | | |
|---|---|---|---|
| 2,844,389 | 7/1958 | Burnett | 280/414.1 |
| 3,568,866 | 3/1971 | Black | 414/467 |
| 3,622,181 | 11/1971 | Smith | 280/414.1 |
| 3,651,969 | 3/1972 | Bledsoe | 414/498 |
| 3,751,073 | 8/1973 | Alexander | 280/482 |
| 4,504,075 | 3/1985 | Dawson | 280/411 C |

Primary Examiner—Joseph F. Peters, Jr.
Assistant Examiner—Everett G. Diederiks, Jr.
Attorney, Agent, or Firm—B. P. Fishburne, Jr.

[57] ABSTRACT

A trailer caravan allows a motor home owner to tow a small automobile and boat in tandem relationship without exceeding overall length limitations. The tongue of a boat trailer is secured to the automobile trailer ahead of it by a pivot pin and a coacting tongue tie-down bar carrying two tongue radius adjusting bolts in opposing relationship to the opposite sides of the boat trailer tongue. Two tension springs are connected between the opposite sides of the boat trailer tongue and automobile trailer to assure proper tracking of the boat trailer while enabling the caravan to negotiate curves with safety.

7 Claims, 6 Drawing Figures

TRAILER CARAVAN

BACKGROUND OF THE INVENTION

Various vehicular trailer configurations are known in the prior art, although none is capable of satisfying the need which has given rise to the present invention. Some examples of the known prior art are contained in U.S. Pat. Nos. 3,568,866; 3,651,969; and 3,751,073.

The present invention has for its objective the provision of a vehicular arrangement which will enable the convenient and economical towing of an automotive vehicle and a boat by a motor home or the like. More particularly, the present invention seeks to provide a convenient and comparatively economical trailer caravan for this purpose. The caravan can be embodied in a conventional carry-all trailer suitable for hauling a small automobile or JEEP directly behind a motor home. A boat trailer is coupled in trailing relationship with the carry-all trailer to haul a boat in tandem with the vehicle on the carry-all trailer.

An important aspect of the invention resides in the arrangement for coupling the two trailers in tandem relationship so that highway curves can be safely negotiated and proper tracking of the boat trailer with security is always assured. The above is accomplished by the use of a unique tie-down bar having a pair of boat trailer tongue radius adjustment bolts and a pair of tracking springs connected between the boat trailer tongue and the sides of the carry-all vehicle trailer. The tie-down bar spans the top of the boat trailer tongue to preclude upward displacement thereof. A pivot pin anchors the boat trailer tongue to the carry-all trailer forwardly of the tie-down bar and provides an articulated joint between the two trailers.

Other features and advantages of the invention will become apparent to those skilled in the art during the course of the following detailed description.

DETAILED DESCRIPTION

Figure 1:
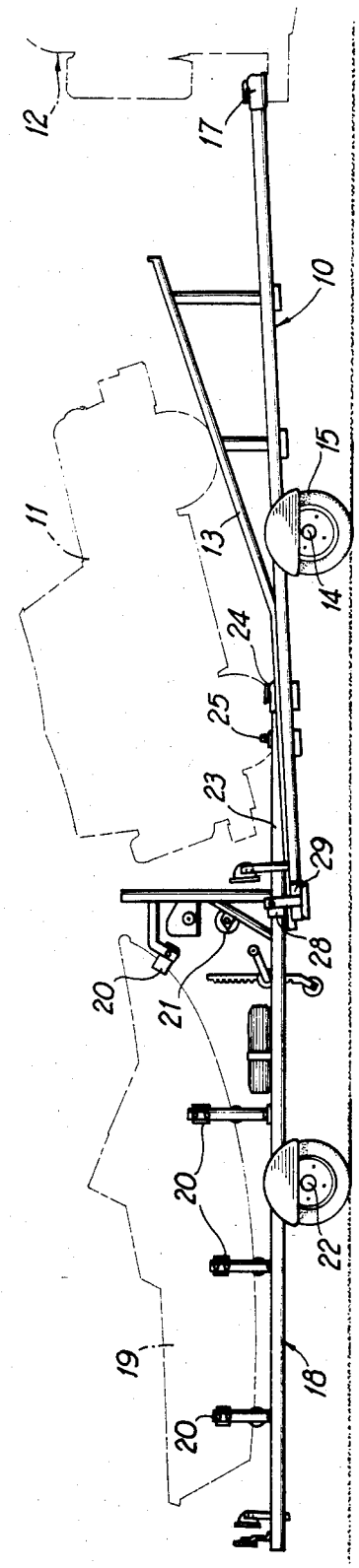
FIG. 1 is a side elevation of a trailer caravan in accordance with the present invention.
Figure 2:
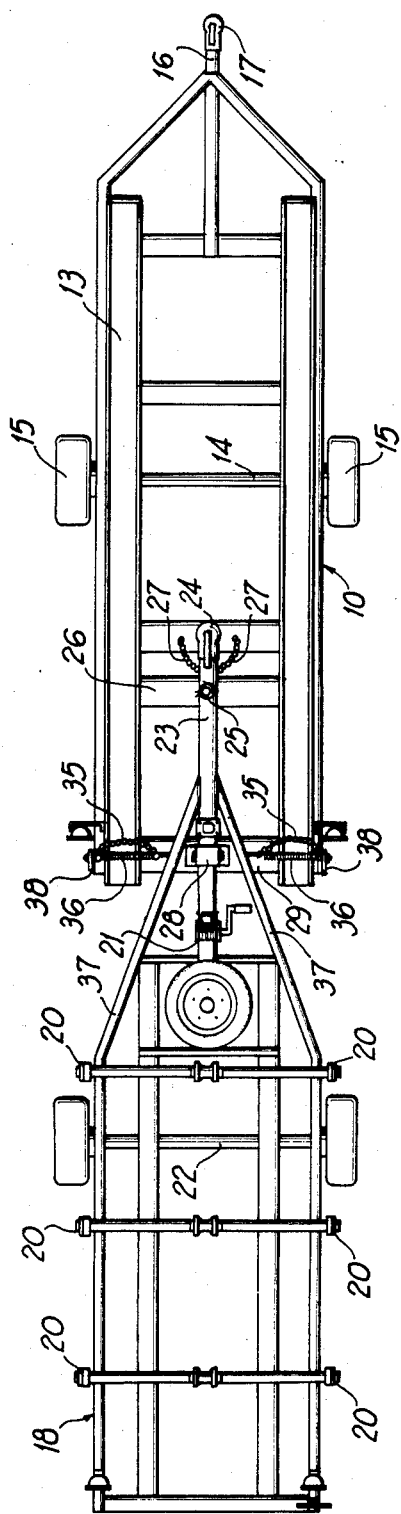
FIG. 2 is a plan view thereof.

Referring to the drawings in detail wherein like numberals designate like parts, a vehicle transport trailer 10, such as the well-known carry-all trailer, is utilized to transport a small automobile 11 or JEEP behind a motor home 12 or like towing vehicle. The carry-all trailer 10 includes a trackway 13 for the automotive vehicle 11 and near its longitudinal center is provided with a single support axle 14 mounting two ground wheels 15. The tongue 16 of the carry-all trailer 10 is equipped with a standard ball receiver 17 to receive a standard hitch ball at the rear of the motor home 12. The carry-all trailer 10 is equipped with safety chains, not shown, and conventional lights. The remaining details of construction of the carry-all trailer 10 are unimportant to a full understanding of the present invention.

A boat trailer 18 of any preferred type is connected in articulated tandem relationship to the trailer 10 in accordance with the essence of the present invention. The boat trailer is used to haul a boat 19 behind the automotive vehicle 11 in a safe and secure manner, without exceeding highway regulations governing the maximum length of the vehicle caravan, which is sixty feet maximum. The boat trailer 18 is equipped with adjustable cradling elements 20, a boat winch 21 and other customary accessories including conventional lights. The boat trailer may have a single axle 22, as shown, or may be of the dual axle type, if preferred. The remaining details of construction of the boat trailer are unimportant to a full understanding of the invention.

Figure 3:
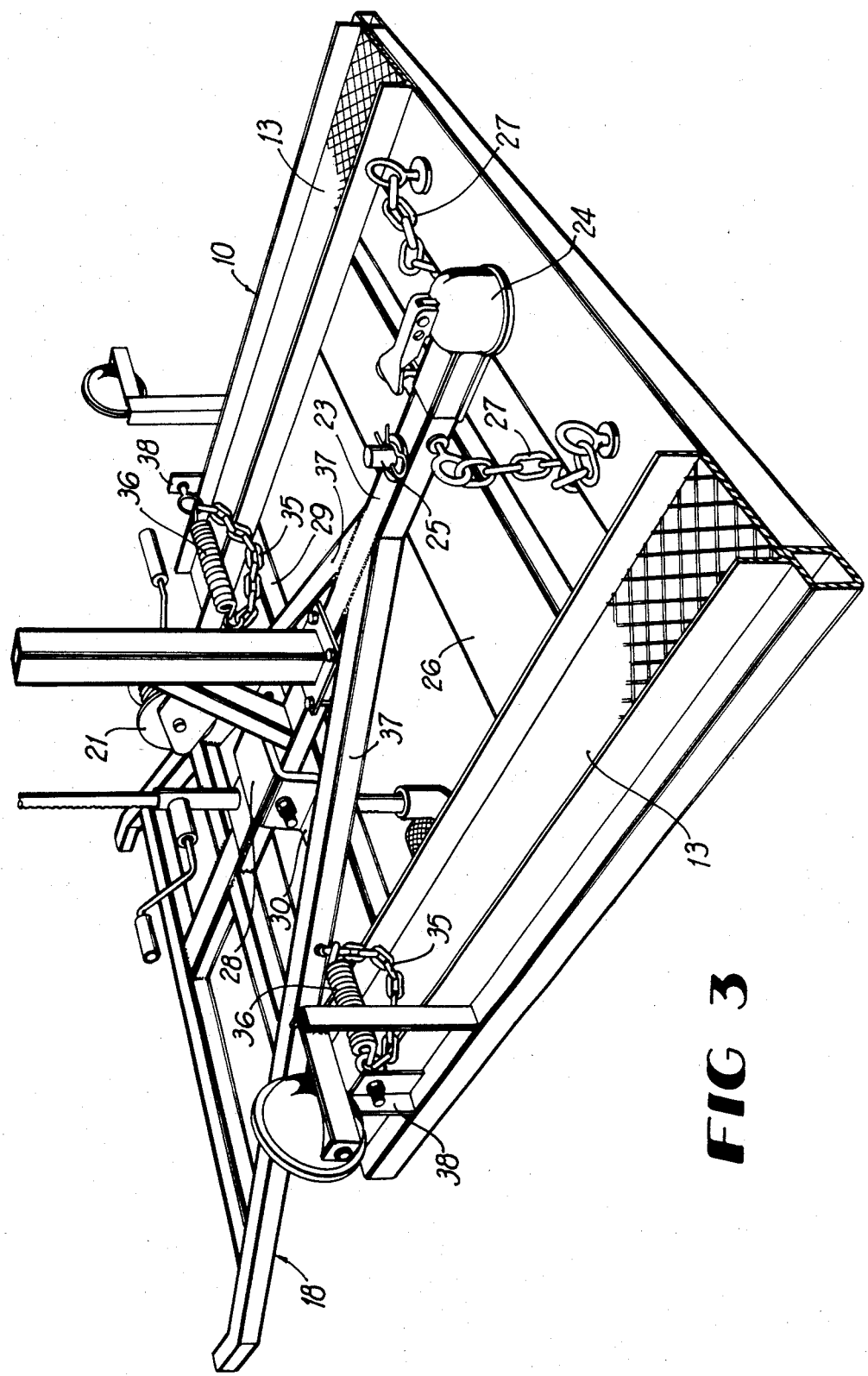
FIG. 3 is an enlarged fragmentary perspective view, partly in section, showing the connection of two trailers in the caravan according to the essence of the present invention.
Figure 4:
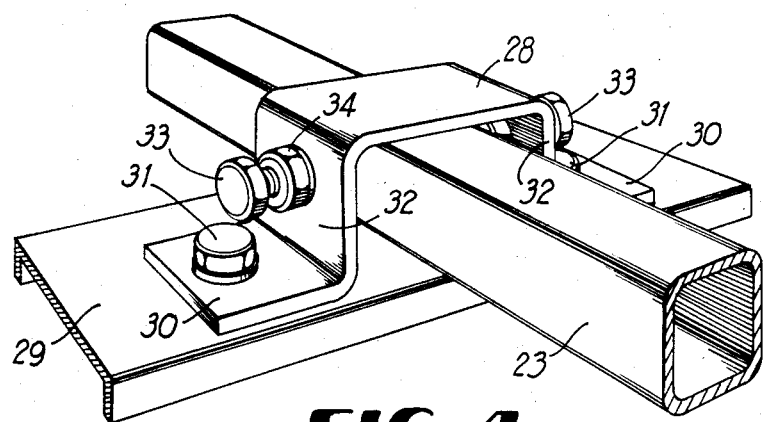
FIG. 4 is an enlarged fragmentary perspective view of a tie-down bar and radius adjustment bolts for a boat trailer tongue in accordance with the invention.
Figure 5:
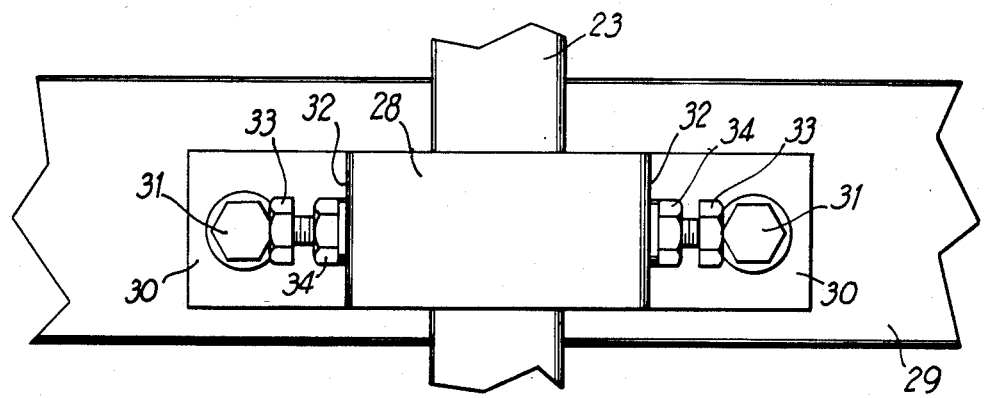
FIG. 5 is a plan view of the elements in FIG. 4.
Figure 6:
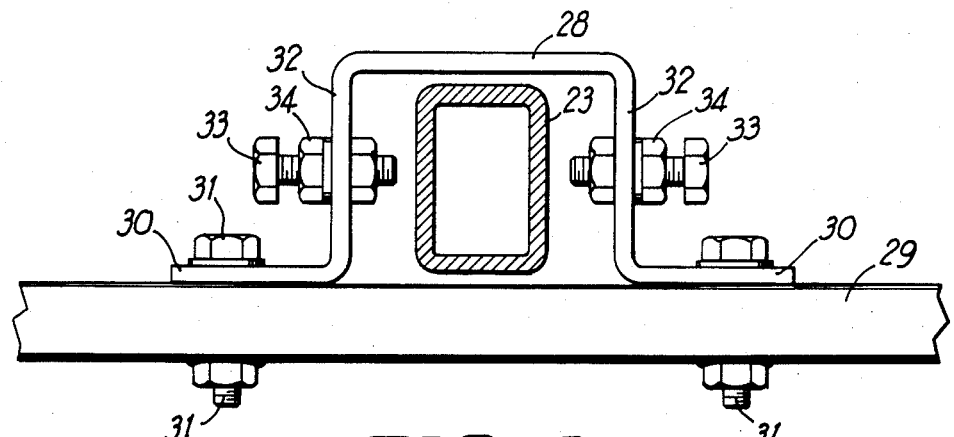
FIG. 6 is a cross sectional view taken at right angles to the boat trailer tongue in FIGS. 4 and 5.

The essence of the invention is depicted in FIGS. 3 to 6. In these figures, the tongue 23 of the boat trailer 18 is positioned to overlie the rear end portion of the carry-all trailer 10 for a substantial distance. Rearwardly of its conventional ball receiver 24 which is idle in the caravan, the boat trailer tongue 23 is connected pivotally to the trailer 10 at the transverse center of the latter by a sturdy vertical axis pin 25 held on a cross member 26 of the trailer 10. Conventional safety chains 27 are connected between the tongue 23 and the carry-all trailer 10.

Rearwardly of the pivot pin 25 and near the rear end of the carry-all trailer 10, a tie-down bar 28 extends transversely above and across the tongue 23 and close to the top of the tongue to prevent any appreciable displacement thereof during travel of the caravan. A transverse frame member 29 on the trailer 10 passes closely beneath the bottom of tongue 23, as shown.

The tie-down bar 28 includes feet 30 on the opposite sides thereof which are anchored by bolts 31 to the member 29. The tie-down bar further includes vertical webs 32 spaced from opposite sides of the tongue 23, and these webs carry opposing horizontal axis radius adjusting screws 33 having lock nuts 34. The spacing of the inner ends of the radius screws 33 from the side walls of the tongue 23 of the boat trailer 18 establishes the turning radius of the boat trailer, and allows the caravan to negotiate roadway curves with safety and stability. The boat trailer 18 is also equipped with its own safety chains 35, as shown.

In order to assure reliable tracking of the boat trailer 18 while allowing passage around curves, a pair of tension springs 36 are connected between the convergent side members 37 of tongue 23 and brackets 38 on the opposite sides of the carry-all trailer 10. These two springs are in substantial coaxial alignment across the caravan adjacent to the tie-down bar 28. The springs also assure proper longitudinal alignment of the caravan on straight roadways.

The arrangement of the tie-down bar 28, pivot pin 25 and tracking springs 36 in accordance with this invention does not preclude using the trailers 10 and 18 separately behind a motor home or other towing vehicle whenever desired. When the boat trailer 18 is used separately, it is coupled through its standard ball receiver 24 with the hitch ball of the towing vehicle.

The advantages, convenience, simplicity, versatility and economy of the invention should now be apparent to those skilled in the art.

It is to be understood that the form of the invention herewith shown and described is to be taken as a preferred example of the same, and that changes in the shape, size and arrangement of parts may be resorted to, without departing from the spirit of the invention or scope of the subjoined claims.

I claim:

1. A trailer caravan comprising an automotive vehicle transport trailer adapted to be coupled to a towing vehicle, a boat transport trailer having a tongue arranged in overlapping relationship with a rear end portion of the automotive vehicle transport trailer, a vertical axis pivot and coupling pin engaged with said tongue and a member of the automotive vehicle transport trailer, a tie-down bar for said tongue fixed to a member of the automotive vehicle transport trailer and extending across the top of the tongue and restraining upward displacement of the tongue, a pair of adjustable tongue radius elements on said tie-down bar in opposing relationship to opposite sides of said tongue, and a pair of tracking springs connected between opposite sides of the tongue and said automotive vehicle transport trailer.

2. A trailer caravan as defined in claim 1, and said member closely underlying said tongue and restraining downward displacement thereof.

3. A trailer caravan as defined in claim 2, and said tie-down bar including vertical webs spaced from the opposite sides of the tongue, and said pair of adjustable tongue radius elements comprising transverse horizontal axis adjusting screws mounted on said vertical webs substantially in coaxial alignment.

4. A trailer caravan as defined in claim 3, and said tie-down bar including feet on opposite sides of the tongue, and fastener means anchoring said feet to said member.

5. A trailer caravan as defined in claim 1, and said tie-down bar being spaced substantially rearwardly along the tongue from the location of said vertical axis pivot and coupling pin.

6. A trailer caravan as defined in claim 5, and said tracking springs comprising substantially coaxial transverse horizontal axis tension springs adjacent to and spaced from opposite sides of the tie-down bar.

7. In a trailer caravan, a first trailer and a second trailer in tandem relationship, the second trailer having a tongue overlying a rear end portion of the first trailer, a vertical axis coupling and pivot pin interconnecting the first trailer and said tongue of the second trailer, a tie-down bar on the first trailer near its rear end and spaced rearwardly of said coupling and pivot pin and extending across the top of said tongue and adjacent to the sides of the tongue in somewhat spaced relationship therewith, a pair of tongue radius adjusting elements on said tie-down bar substantially in alignment with the opposite sides of said tongue, and said tongue radius adjusting elements comprising a pair of substantially coaxial adjusting screws having locking means thereon.

* * * * *